Patented Feb. 26, 1952

2,587,001

UNITED STATES PATENT OFFICE 2,587,001

METHOD OF PREPARING MAGNESIUM HYDROXIDE

Jean Charles Seailles, Paris, France

No Drawing. Application August 6, 1947, Serial No. 766,896. In France December 10, 1942

3 Claims. (Cl. 23—201)

It is known to prepare magnesium hydroxide by reaction of lime or dolomite with solutions of magnesium salts such as sea water, residual water from salines or the like. Depending on the subsequent use contemplated for the final product, it may be desired to obtain the magnesia product resulting from such reaction in a form which is as dense as possible in order to facilitate its separation or, on the other hand, as dispersed as possible so as to finally form a homogeneous and stable suspension which is particularly necessary when the production of magnesia milk is contemplated.

In the French Patent No. 862,074 granted the 3rd of December 1939, I have disclosed a method of obtaining dense precipitates of magnesia hydrate from sea-water or magnesian solutions treated with lime, the reaction being repeated several times in the presence of the precipitate already formed. By means of subsequent precipitations, I have thus obtained a precipitate which at each stage is heavier and less bulky and is adapted to settle more and more rapidly.

In the same French patent, it is stated that it may be useful to previously condition the initial sea-water or magnesian solution by slightly acidifying it with the aid of a strong acid such as HCl so as to decompose the bicarbonates contained therein, and then to aerate it in order to expel the carbon dioxide. The result is a very pure magnesia absolutely free from carbonate of lime.

On examining this question of conditioning, I have made the surprising discovery that the nature of the acid employed in said previous conditioning effects the properties of the precipitate obtained by the subsequent treatment with lime or dolomite. That is, after decantation, this precipitate occupies a volume which depends on the choice of the acid.

For example, in effecting the precipitation of magnesia, that is, magnesium hydroxide, so as to obtain, by subsequent precipitations, a heavier and less bulky product settling more and more rapidly at each precipitating step and on comparing the precipitates after an equal number of successive steps, for example after 15 steps, the following observations will be made:

If crude sea-water has been employed, the volume of the precipitate is stated as 100 for purposes of comparison.

If the sea-water has been previously treated with muriatic acid, the volume is equal to 70.

If the sea-water has been previously treated with sulfuric acid, the volume is equal to 50.

If the sea-water has been previously treated with orthophosphoric acid, the volume increases beyond 200.

The object of the invention is to utilize this unexpected phenomenon on an industrial scale so as to obtain at will precipitates showing different properties in response to the industrial use contemplated therefor.

This makes it possible to obtain at will either poorly dispersed precipitates (obtained by the use of sulfuric acid) or on the other hand light weight and well dispersed precipitates (use of orthophosphoric acid).

In connection with these highly dispersed precipitates, it is to be noted that the result may be obtained either by treating the magnesian solution itself or on the other hand by simply treating the magnesium hydroxide already formed, either wet or dried, as will be explained in the examples given hereinafter.

This latter possibility is of particular interest, in that it allows for example the magnesium hydroxide to be precipitated under its dense form and then transformed into a voluminous milk adapted for the purposes in connection with which this peculiar state is advantageous.

Moreover, this treatment in two stages permits the initial magnesium hydroxide to be obtained by a single process yielding that dense quality which is the most desirable and the most economical for many purposes, whereupon only part of the material is transformed by a special treatment into lighter products.

Until now, the use of $H_2SO_4$ has not yet been contemplated because it was feared that by enriching the liquids in reaction with the little soluble $CaSO_4$, there might result the presence of impurities in the final magnesium hydroxide product. It has been found that this drawback does not exist in case of sea-water as the solution of magnesium salts usually employed.

A desirable modification of the invention consists of effecting a partial conditioning with the aid of a mineral acid such as HCl or $H_2SO_4$ and completing said conditioning operation with the particular acid which gives the result aimed at, for example, orthophosphoric acid. This procedure is obviously highly advantageous so far as the cost-price is concerned.

The examples of the procedure of the invention are given hereinafter by way of illustration and not of limitation.

*First example.*—Sea-water is conditioned with a view to freeing it of its bicarbonates, this operation being performed through acidification and subsequent separation. The acid employed for this purpose is orthophosphoric acid. A solution containing one tenth of said acid and having a specific gravity of 1.9 to 2 cubic centimeters per cubic decimeter of sea-water is added, so as to reduce the pH to less than 5. The mixture is stirred and separated either by blowing air into and through it or by causing the liquid to drop in highly divided spray form. The sea-water thus conditioned is then treated with lime-water according to the teachings of the French Patent No. 862,074 granted the 3rd of December 1939.

The magnesium hydroxide which precipitates is very bulky. It is separated for example by causing the precipitate to settle, then another treatment is effected with new reagents in the presence of the precipitate already formed. This operation is repeated several times, preferably about fifteen times or more, the number of these operations depending naturally on the final result which is desired.

It is also possible to operate in a continuous manner with a mixture of sea-water, lime-water and a suspension of magnesium hydroxide already precipitated but recycled into the circuit.

If 100 represents the volume of the precipitate settling after 24 hours quiescent condition in the case of crude sea-water, and 50 the volume obtained under the same conditions in the case of sea-water, conditioned by sulphuric acid, then the precipitate settling after 24 hours quiescence from sea-water which has been conditioned by orthophosphoric acid reaches a volume of 250 to 300 while containing the same amount of magnesia hydrate. Thus the use of phosphoric acid, provides the possibility of dispersing the precipitate of pure magnesia in a volume of water 5 to 6 times greater than in case of conditioning with sulphuric acid. The milky liquid thus obtained is particularly light and unctuous and it remains stable.

The salts of orthophosphoric acid, those of metaphosphoric acid and of pyrophosphoric acid exert a much lower swelling effect.

*Second example.*—It may also be desired to disperse a precipitate of wet or dry magnesia hydrate which has been prepared previously. It then is simply necessary to place this precipitate in an aqueous suspension and add a small quantity of orthophosphoric acid so as to obtain after settling a new precipitate having a volume about 2.6 times greater. Under these conditions; the precipitate will be less milky and less unctuous than in the first example.

Having now particularly described and ascertained the nature of my said invention and in what manner the same is to be performed, I declare that what I claim is:

1. In preparing magnesium hydroxide from brine containing a dissolved bicarbonate of a metal and dissolved magnesium salts, the method which comprises mixing with the said brine phosphoric acid in amount to decompose substantially all the bicarbonate, separating the carbon dioxide thus liberated in gaseous form from the solution, mixing previously precipitated magnesium hydroxide into the said solution, so as to form a suspension of particles of magnesium hydroxide, and then mixing the solution with calcium hydroxide in amount at least approximately equivalent to the magnesium salts present, the addition of lime causing precipitation of magnesium hydroxide, the magnesium hydroxide mixed into the solution being that produced in a previous treatment of the kind described so that the magnesium hydroxide precipitated by the lime forms in contact with the previously precipitated magnesium hydroxide, and the phosphoric acid serving to give a voluminous precipitate of magnesium hydroxide of low density.

2. The method described in claim 1, the phosphoric acid used being added in amount to establish the pH at a numerical value not above 5.

3. In making a dispersed magnesium hydroxide of low density from a dense precipitated magnesium hydroxide, the method which comprises forming an aqueous suspension of the said dense magnesium hydroxide in water and mixing phosphoric acid with the said suspension, the contact of the magnesium hydroxide in suspension with the phosphoric acid producing a voluminous product of overall volume substantially greater than the volume under comparable conditions of the dense magnesium hydroxide used initially.

JEAN CHARLES SEAILLES.

REFERENCES CITED

The following references are of record in the file of this patent:

UNITED STATES PATENTS

| Number | Name | Date |
|---|---|---|
| 2,118,353 | MacIntire | May 24, 1938 |
| 2,273,178 | Collins | Feb. 17, 1942 |
| 2,276,245 | Clarke | Mar. 10, 1942 |
| 2,433,458 | Kahn et al. | Dec. 30, 1947 |

FOREIGN PATENTS

| Number | Country | Date |
|---|---|---|
| 862,074 | France | Nov. 22, 1940 |